(12) United States Patent
Gao (10) Patent No.: US 9,594,936 B1
(45) Date of Patent: Mar. 14, 2017

(54) SYSTEM AND METHOD FOR IMPROVED READING OF DATA FROM REFLECTIVE SURFACES OF ELECTRONIC DEVICES

(71) Applicant: Datalogic USA, Inc., Eugene, OR (US)

(72) Inventor: WenLiang Gao, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 14/932,850

(22) Filed: Nov. 4, 2015

(51) Int. Cl.
*G06K 7/10* (2006.01)
*G06K 19/06* (2006.01)

(52) U.S. Cl.
CPC ... *G06K 7/10584* (2013.01); *G06K 19/06028* (2013.01); *G06K 2007/10495* (2013.01)

(58) Field of Classification Search
CPC ........... G06K 7/10732; G06K 7/10722; G06K 7/10752; G06K 7/10881; G06K 7/0004; G06K 7/10851; G06K 7/1096; H04N 5/2256; H04N 5/23293; H04N 5/2353
USPC .............. 235/462.01–462.45, 472.01–472.03
See application file for complete search history.

(56) References Cited

U.S. PATENT DOCUMENTS

| | | | |
|---|---|---|---|
| 4,315,245 A | 2/1982 | Nakahara et al. | |
| 4,578,571 A | 3/1986 | Williams | |
| 4,930,884 A | 6/1990 | Tichenor | |
| 4,949,391 A | 8/1990 | Faulkerson et al. | |
| 4,969,034 A | 11/1990 | Salvati | |
| 5,010,241 A | 4/1991 | Butterworth | |
| 5,130,856 A | 7/1992 | Tichenor | |
| 5,245,168 A | 9/1993 | Shigeta | |
| 5,250,791 A | 10/1993 | Heiman et al. | |
| 5,430,558 A | 7/1995 | Sohaei et al. | |
| 5,475,207 A | 12/1995 | Bobba | |
| 5,572,006 A | 11/1996 | Wang et al. | |
| 5,585,616 A | 12/1996 | Roxby et al. | |
| 5,648,650 A | 7/1997 | Sugifune et al. | |
| 5,701,001 A | 12/1997 | Sugifune et al. | |

(Continued)

FOREIGN PATENT DOCUMENTS

| | | |
|---|---|---|
| CN | 1178957 | 4/1998 |
| CN | 101031930 | 9/2007 |

(Continued)

OTHER PUBLICATIONS

Hensel Jr., "Cell phone boarding passes going into use here first" http://www.chron.com/disp.story.mpl/front/5349969.html, visited Feb. 19, 2010.

(Continued)

*Primary Examiner* — Thien M Le
(74) *Attorney, Agent, or Firm* — Stoel Rives LLP (57) ABSTRACT

Disclosed systems and methods for a data reader operable to capture one or more images from items having a highly, or relatively highly, reflective surface. The data reader includes a controller/processor in operative communication with an imager and an illumination system, where the controller/processor is programmed to selectively operate the imager and the illumination systems to interleave the data reader between a first reading period for reading items having a surface with little or no reflectivity and a second reading period for reading items having a surface with high reflectivity. In some embodiments, the items with highly reflective surfaces may include electronic devices, such as mobile phones.

20 Claims, 4 Drawing Sheets

(56) References Cited

U.S. PATENT DOCUMENTS

| | | | |
|---|---|---|---|
| 5,705,802 A | 1/1998 | Bobba | |
| 5,723,868 A | 3/1998 | Hammond | |
| 5,756,981 A | 5/1998 | Roustaei et al. | |
| 5,793,031 A | 8/1998 | Tani et al. | |
| 5,837,988 A | 11/1998 | Bobba | |
| 5,936,218 A | 8/1999 | Ohkawa | |
| 5,949,054 A | 9/1999 | Karpen et al. | |
| 5,969,325 A | 10/1999 | Hecht et al. | |
| 6,061,091 A | 5/2000 | Van de Poel et al. | |
| 6,065,678 A | 5/2000 | Li et al. | |
| 6,189,795 B1 | 2/2001 | Ohkawa et al. | |
| 6,230,975 B1 | 5/2001 | Colley et al. | |
| 6,254,003 B1 | 7/2001 | Pettinelli et al. | |
| 6,290,135 B1 | 9/2001 | Acosta et al. | |
| 6,318,635 B1 | 11/2001 | Stoner | |
| 6,347,163 B2 | 2/2002 | Roustaei | |
| 6,462,880 B1 | 10/2002 | Ohkawa et al. | |
| 6,505,778 B1 | 1/2003 | Reddersen et al. | |
| 6,561,427 B2 | 5/2003 | Davis et al. | |
| 6,568,598 B1 | 5/2003 | Bobba | |
| 6,609,660 B1 | 8/2003 | Stoner | |
| 6,631,844 B1 | 10/2003 | Ohkawa | |
| 6,708,883 B2 | 3/2004 | Krichever | |
| 6,749,120 B2 | 6/2004 | Hung et al. | |
| 6,783,068 B2 | 8/2004 | Hecht | |
| 6,825,486 B1 | 11/2004 | Cole et al. | |
| 6,906,699 B1 | 6/2005 | Fahraeus et al. | |
| 6,974,084 B2 | 12/2005 | Bobba | |
| 6,980,692 B2 | 12/2005 | Chamberlain | |
| 6,991,169 B2 | 1/2006 | Bobba | |
| 7,097,102 B2 | 8/2006 | Patel et al. | |
| 7,119,932 B2 | 10/2006 | Sato et al. | |
| 7,131,587 B2 | 11/2006 | He et al. | |
| 7,147,159 B2 | 12/2006 | Longacre, Jr. et al. | |
| 7,148,923 B2 | 12/2006 | Harper et al. | |
| 7,172,125 B2 | 2/2007 | Wang et al. | |
| 7,178,734 B1 | 2/2007 | Hammer | |
| 7,198,195 B2 | 4/2007 | Bobba | |
| 7,204,420 B2 | 4/2007 | Barkan et al. | |
| 7,212,279 B1 | 5/2007 | Feng | |
| 7,227,117 B1 | 6/2007 | Lackemann et al. | |
| 7,234,641 B2 | 6/2007 | Olmstead | |
| 7,290,711 B2 | 11/2007 | Barkan | |
| 7,296,744 B2 | 11/2007 | He | |
| 7,308,375 B2 | 12/2007 | Jensen et al. | |
| 7,398,927 B2 | 7/2008 | Olmstead et al. | |
| 7,450,559 B2 | 11/2008 | Schotten et al. | |
| 7,461,790 B2 | 12/2008 | McQueen et al. | |
| 7,475,821 B2 | 1/2009 | Barkan et al. | |
| 7,490,770 B2 | 2/2009 | Shearin | |
| 7,490,776 B2 | 2/2009 | Thuries | |
| 7,494,065 B2 | 2/2009 | Barkan et al. | |
| 7,527,207 B2 | 5/2009 | Acosta et al. | |
| 7,546,951 B2 | 6/2009 | Kotlarsky et al. | |
| 7,568,623 B2 | 8/2009 | Retter et al. | |
| 7,762,464 B2 | 7/2010 | Goren et al. | |
| 7,984,854 B2 | 7/2011 | Nadabar | |
| 8,089,665 B2 * | 1/2012 | Omori | B41J 2/473 |
| | | | 235/454 |
| 8,387,881 B2 | 3/2013 | Van Volkinburg et al. | |
| 8,573,497 B2 | 11/2013 | Gao et al. | |
| 8,622,299 B2 | 1/2014 | Crooks et al. | |
| 2002/0039137 A1 | 4/2002 | Harper et al. | |
| 2002/0067850 A1 | 6/2002 | Williams et al. | |
| 2002/0070278 A1 | 6/2002 | Hung et al. | |
| 2002/0084330 A1 | 7/2002 | Chiu | |
| 2003/0002024 A1 * | 1/2003 | Motegi | G03F 7/70058 |
| | | | 355/69 |
| 2003/0098352 A1 | 5/2003 | Schnee et al. | |
| 2003/0230630 A1 | 12/2003 | Whipple et al. | |
| 2004/0118928 A1 | 6/2004 | Patel et al. | |
| 2004/0179254 A1 | 9/2004 | Lewis et al. | |
| 2004/0246367 A1 | 12/2004 | Yoshida | |
| 2005/0116044 A1 * | 6/2005 | Zhu | G06K 7/10732 |
| | | | 235/462.45 |
| 2005/0135798 A1 * | 6/2005 | Szajewski | G03B 41/00 |
| | | | 396/335 |
| 2005/0156047 A1 | 7/2005 | Chiba et al. | |
| 2005/0253937 A1 | 11/2005 | Moholt et al. | |
| 2006/0011725 A1 | 1/2006 | Schnee | |
| 2006/0043194 A1 | 3/2006 | Barkan et al. | |
| 2006/0118629 A1 | 6/2006 | Shiramizu et al. | |
| 2006/0163355 A1 | 7/2006 | Olmstead et al. | |
| 2006/0255150 A1 | 11/2006 | Longacre, Jr. | |
| 2007/0001015 A1 | 1/2007 | Suzuki et al. | |
| 2007/0034696 A1 | 2/2007 | Barkan et al. | |
| 2007/0035718 A1 | 2/2007 | Haddad | |
| 2007/0040034 A1 | 2/2007 | Hennick et al. | |
| 2007/0158428 A1 | 7/2007 | Havens et al. | |
| 2007/0181692 A1 | 8/2007 | Barkan et al. | |
| 2007/0295812 A1 * | 12/2007 | Mazowiesky | G07D 7/121 |
| | | | 235/454 |
| 2007/0295814 A1 | 12/2007 | Tanaka et al. | |
| 2008/0011855 A1 | 1/2008 | Nadabar | |
| 2008/0035732 A1 | 2/2008 | Vinogradov et al. | |
| 2008/0035733 A1 | 2/2008 | Vinogradov et al. | |
| 2008/0080785 A1 | 4/2008 | Ford | |
| 2008/0099561 A1 | 5/2008 | Douma | |
| 2008/0105745 A1 | 5/2008 | Lei | |
| 2008/0191022 A1 | 8/2008 | Barkan et al. | |
| 2008/0266425 A1 * | 10/2008 | Shurboff | H04N 5/23293 |
| | | | 348/241 |
| 2009/0001166 A1 | 1/2009 | Barkan et al. | |
| 2009/0001168 A1 | 1/2009 | Hammer | |
| 2009/0057412 A1 | 3/2009 | Bhella et al. | |
| 2009/0108076 A1 | 4/2009 | Barkan et al. | |
| 2009/0167490 A1 | 7/2009 | Hayaashi et al. | |
| 2010/0147948 A1 | 6/2010 | Powell et al. | |
| 2010/0213259 A1 | 8/2010 | Gao | |
| 2010/0219249 A1 | 9/2010 | Barkan | |
| 2010/0245270 A1 | 9/2010 | Nako | |
| 2011/0050650 A1 * | 3/2011 | McGibney | G06F 3/0386 |
| | | | 345/175 |
| 2011/0157089 A1 | 6/2011 | Rainisto | |
| 2012/0000982 A1 | 1/2012 | Gao | |
| 2012/0018516 A1 | 1/2012 | Gao | |
| 2012/0067956 A1 | 3/2012 | Gao et al. | |
| 2012/0111944 A1 | 5/2012 | Gao et al. | |
| 2012/0138684 A1 | 6/2012 | Van Volkinburg et al. | |
| 2012/0181338 A1 | 7/2012 | Gao | |
| 2012/0193429 A1 | 8/2012 | Van Volkinburg et al. | |
| 2012/0248184 A1 | 10/2012 | Naito | |
| 2013/0062412 A1 | 3/2013 | Tan et al. | |
| 2013/0075464 A1 | 3/2013 | Van Horn et al. | |
| 2013/0082109 A1 | 4/2013 | Meier et al. | |
| 2013/0134217 A1 | 5/2013 | Crooks et al. | |
| 2013/0181055 A1 | 7/2013 | Liu et al. | |
| 2015/0001294 A1 | 1/2015 | Zocca et al. | |

FOREIGN PATENT DOCUMENTS

| | | |
|---|---|---|
| CN | 101710407 | 5/2010 |
| EP | 0574024 A2 | 12/1993 |
| JP | 08-129597 A | 5/1996 |
| JP | 2009-544105 A | 12/2009 |
| KR | 10-2007-0063899 A | 6/2007 |
| KR | 10-2009-0110245 | 10/2009 |

OTHER PUBLICATIONS

Reardon "Cell phone as boarding pass," http://news.cnet.com/8301-10784_3-9896859-7.html, visited Feb. 19, 2010.

TSA Blog, "TSA Paperless Boarding Pass Pilot Expanding," http://www.tsa.gov/blog/2009/06/tsa:paperless-boarding_-pass-pilot.html, visited Feb. 19, 2010.

Mobile Commerce Daily, "Hexaware launches 2D bar code boarding pass service," http://www.mobilecommercedaily.com/2009/11/30/hexaware-launches-2d-bar-code-boarding-pass-service , visited Feb. 19, 2010.

American Airlines, "Introducing Mobile Boarding Passes," http://www.aa.com/i_l8n/urls/mobileBoarding.jsp, visited Feb. 19, 2010.

(56) References Cited

OTHER PUBLICATIONS

International Patent Application No. PCT/US2011/049556, International Search Report and Written Opinion, Feb. 9, 2012, 2 pages.
International Search Report, PCT/US2011/060232, Apr. 27, 2012.
International Search Report, PCT/US2011/036295, mailed Nov. 23, 2011.
Datalogic™, Magellan™ 3200Vsl On-Counter Vertical Presentation Scanner, Product Reference Guide, Rev. A. Jul. 2010.

* cited by examiner fig.1 fig.2

SYSTEM AND METHOD FOR IMPROVED READING OF DATA FROM REFLECTIVE SURFACES OF ELECTRONIC DEVICES

BACKGROUND

The field of the disclosure relates generally to data reading devices, and particularly, to improved data reading devices for reading data from a reflective surface of electronic devices.

Optical codes, such as barcodes and other machine-readable indicia, appear in a variety of applications. There are a variety of forms, such as: linear barcodes (e.g., UPC code), 2D codes including stacked barcodes (e.g., PDF-417 code), and matrix codes (e.g., Datamatrix code, QR code, or Maxicode). There are several types of data readers used for reading these optical codes. The most common types of optical code readers are laser scanners and imaging readers. A laser scanner typically moves, i.e. scans, a laser light beam across the barcode. Imaging readers are typically used to capture a 2D image of an area, including the optical code or other scene, focused onto a detector array such as charge-coupled devices (CCDs) and complementary metal oxide semiconductor (CMOS) imagers. With some such imaging readers, it may be advantageous to provide a source of illumination that illuminates the optical code or other scene being imaged, to provide the required signal response in the imaging device. Such a source of illumination can reduce exposure time, thereby improving imager performance, especially in low ambient light conditions and when imaging moving items.

Typically, in a grocery or retail establishment, optical codes are often printed directly on items or printed on a sticker that is thereafter affixed to the item. These optical codes are usually printed or located on surfaces with little or no reflectivity so that illumination from a data reading device is not reflected back toward the data reading device, which may render the image obtained by the data reader difficult to process.

Businesses have begun sending optical codes to customers who display such optical codes on a portable electronic device, such as a mobile telephone or cell phone, personal digital assistant, palm, tablet, or laptop computer, or other suitable device having an electronic display, such as a liquid crystal display (LCD). For example, an airline passenger may display an optical code on a portable electronic device for an airline employee to read using a data reader as verification of the passenger's ticket. Or, a customer in a store may display an optical code on a portable electronic device for a cashier to read using a data reader to redeem a coupon. Optical codes are also included on other items having highly, or relatively highly, reflective surfaces, for example, but not limited to, identification (ID) cards, aluminum cans, and objects in plastic packaging.

The present inventors have recognized that optical codes presented on, or under, a highly, or relatively highly, reflective surface are typically difficult to decode using general-purpose data readers. For example, the present inventors have recognized that general-purpose data readers commonly use artificial illumination to illuminate an object bearing an optical code to create an image of the optical code having sufficient contrast for decoding the optical code. The present inventors have also recognized that highly, or relatively highly, reflective surfaces bearing optical codes commonly reflect a large amount of such artificial illumination resulting in a saturated, or partially saturated, image that does not have sufficient contrast for decoding the optical code because all, or portions, of the image appear light, or white. However, simply eliminating the artificial illumination is not a practicable solution since the data reader may not otherwise have sufficient illumination to read optical labels from non-reflective items, which would likely be the most common use of the data reader.

Other general-purpose data readers may be capable of detecting the presence of an electronic device or other reflective surface by detecting the amount of light reflected toward the data reader. In some systems, the data reader may attempt to switch from a primary data reading mode (e.g., reading data from items having non-reflective surfaces or surfaces with relatively low reflectivity) to a secondary reading mode (e.g., reading data from items having highly reflective surfaces) in response to detecting the electronic device. However, many existing data readers have difficulty reliably detecting the presence of an electronic device. In such cases, the data reader may improperly switch to the secondary reading mode, thereby being unable to read normal optical codes on non-reflective surfaces, or may fail to properly switch over when presented with an electronic device, thereby being unable to read data from highly-reflective surfaces of the electronic device.

Still other data readers attempt to divide the imager between the primary and secondary reading modes, dedicating a specific percentage of the imager exclusively to each reading mode. Accordingly, the imager includes an area specifically dedicated to detecting an electronic device and reading data therefrom, and an area specifically dedicated to reading data from non-reflective surfaces. However, the present inventors have recognized that a disadvantage of this configuration is that the data reader dedicates significant resources for reading data from electronic devices regardless of whether such a device is present or not, which detrimentally affects overall performance of the data reader by reducing resources that may be used for reading data from non-reflective surfaces, which as noted previously, is likely the most common use of the data reader.

Thus, the present inventors have identified a need for a general-purpose data reader that has improved versatility in handling reading of optical codes appearing on (or behind) highly, or relatively highly, reflective surfaces, as well as reading optical codes appearing on surfaces have no or little reflectivity.

SUMMARY

Methods and systems are disclosed for improved reading of optical codes on highly reflective surfaces, such as a display on a mobile phone or other electronic device.

In one example system/method, the data reader includes an imager having a first portion for reading optical codes from electronic devices or from other highly reflective surfaces, and a second portion dedicated to reading optical codes from non-reflective surfaces or surface having little reflectivity. The data reader includes an illumination module and a processor designed to control the illumination output during the reading process, where the processor controls the output depending on whether the data reader is obtaining data from a highly reflective surface or from a non-reflective surface (or surface with low reflectivity). In some embodiments, the processor interleaves the first portion of the imager to alternate between reading periods for highly reflective and non-reflective surfaces. By interleaving the first portion of the imager, the data reader may be able to quickly and efficiently read data from a variety of surfaces while also minimizing reflectivity issues.

Additional aspects and advantages will be apparent from the following detailed description of example embodiments, which proceeds with reference to the accompanying drawings.

DETAILED DESCRIPTION OF EXAMPLE EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

In the following description of the figures and any example embodiments, the system may be referred to in conjunction with use at a retail establishment. It should be understood that such use is merely one example use for such a system. Other uses for a system with the characteristics and features described herein may be implemented, for example, in an industrial location such as a parcel distribution (e.g., postal) station or for processing inventory, as well as other suitable uses that may involve reading optical codes from electronic devices or other reflective surfaces. In addition, for convenience, certain embodiments may refer to the data reader operable for capturing optical codes from a mobile or cellular phone. It should be understood that this is merely one example embodiment and use of the system with the features and functionalities described herein. The system may be used to capture optical codes from any suitable device or product having a reflective surface.

For convenience, the following description may at times refer to the data reader having a normal label reading mode or period and an electronic device reading mode or period. References to the normal label reading mode or period may refer to instances where the data reader is used to obtain images from items having surfaces with little or no reflectivity such that specular reflection issues do not meaningfully interfere with an ability of the data reader to capture a decodable image (i.e., reflected illumination does not saturate the imager). References to the electronic device reading mode or period may refer to instances where the data reader is used to obtain images from items having surfaces with high reflectivity, and in some cases self-illuminating displays, such as electronic devices with LCD display screens, where reflected illumination may saturate the imager and interfere with an ability of the data reader to capture a decodable image from an electronic device. These references are meant to establish a frame of reference for convenience purposes and are not intended to otherwise limit the disclosure.

Collectively, FIGS. 1-8 illustrate embodiments of a data reader 10 that may be used in a typical checkout process, such as in a retail store or supermarket, to read optical codes or other data from typical grocery items and from electronic devices regardless of the reflectivity characteristics of the surface to which the optical label or data is affixed or otherwise presented on. Since many customers nowadays use their mobile phones or other electronic devices to carry coupons, loyalty cards, identification cards, credit cards, or other items that may be part of a typical checkout transaction, it is advantageous for a single data reader 10 to have the capability of reading data from a variety of sources, including from screens and electronic devices that may have highly reflective surfaces.

Figure 1:
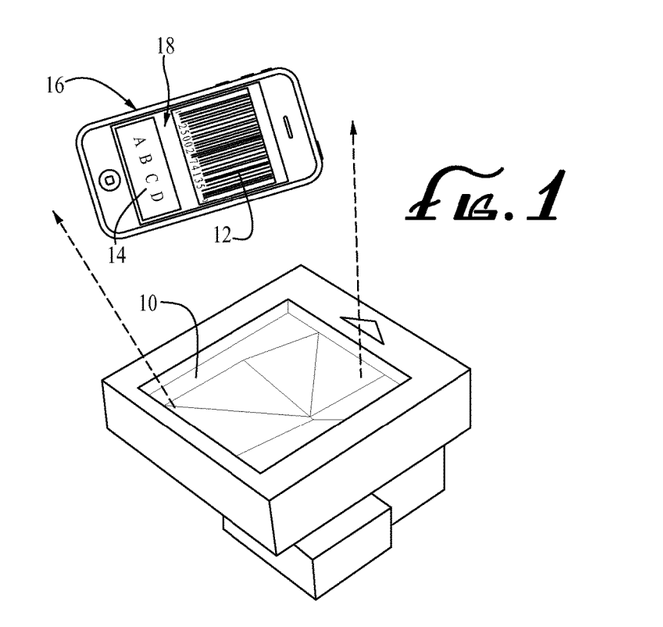
FIG. 1 schematically illustrates a data reader reading an optical code displayed on a display screen of an electronic device.

For example, with reference to FIG. 1, in one embodiment, the data reader 10 is capable of easily and efficiently reading the optical label or other data 12 from a display screen 14 of an electronic device 16, while minimizing or entirely avoiding specular reflection issues that may arise due to the high reflectivity of an exterior surface 18 of the display screen 14. The data reader 10 is also easily able to read an optical label or barcode (not shown) affixed to a typical grocery item, such as a cereal box or the like, where specular reflection may not be an issue because the optical label is typically printed on or otherwise affixed on a surface with little or no reflectivity. As is explained in more detail below, the data reader 10 may be used during a typical checkout process to read optical codes or other data from normal items 50 (see FIG. 6) and also from an electronic device 16 without requiring the operator to cycle between different readers or manually toggle between different reading modes of a data reader. Additional details of these and other embodiments of the data reader 10 are described herein with reference to the figures.

FIG. 1 is a diagrammatic view of a data reader 10 in accordance with one embodiment shown reading a barcode 12 displayed on the display screen 14 of a pda (personal digital assistant) or cell phone 16 (a smartphone being illustrated). The data reader 10 is illustrated as a Magellan 3300HSi model bar code reader available from Datalogic of Eugene Oreg. (U.S.A.), but any suitable imaging reader may be employed. The data reader 10 is schematically depicted as a horizontal single plane scanner suitable for reading optical codes, symbols, or other items. The data reader 10 is illustrated, by way of example, as a single window reader, but in other embodiments may be a presentation scanner, a multi-window reader, or may be arranged in any one of a variety of suitable configurations. The reader 10 may be configured as a fixed unit (mountable to a support surface or free standing on a horizontal surface) or a handheld unit. The reader 10 may alternately be configured as a combined handheld/fixed unit, e.g., one that may rest/be self-supporting upon a horizontal surface but be grasped by the user and moved to aim toward an item to be read.

Figure 2:
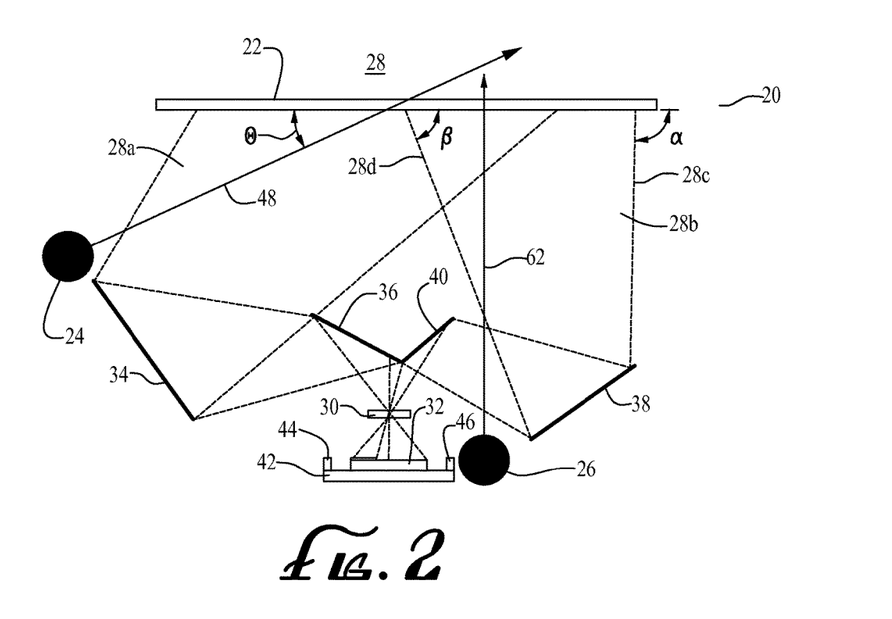
FIG. 2 is a diagrammatic view of a data reader according to an example embodiment.
Figure 3:
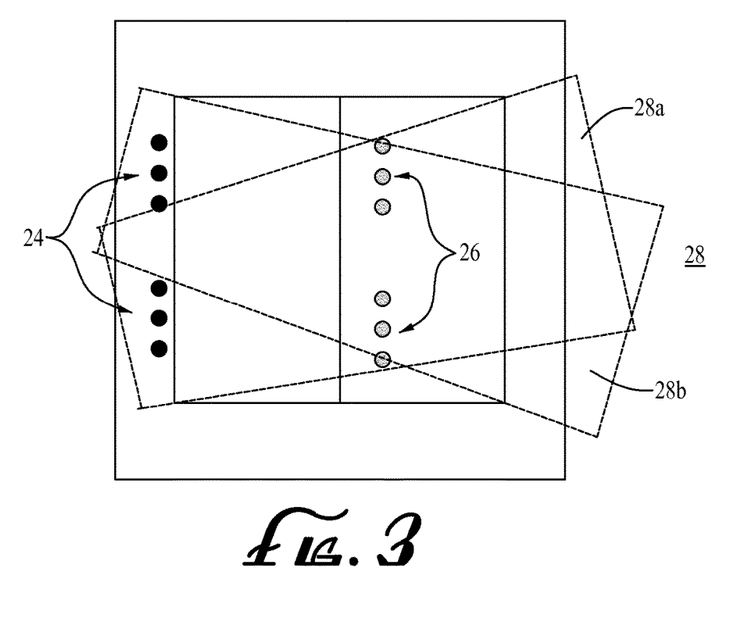
FIG. 3 is a diagrammatic top view of the data reader of FIG. 2.

FIGS. 2 and 3 are diagrams illustrating elements of the data reader 10 inside a housing 20 according to one embodiment. The data reader 10 includes an elongated window 22 and an illumination system comprising one or more illumination sources 24, 26 (illustrated in FIG. 3 as a row of group LEDs) for illuminating the read region 28 in front of the window 22. The data reader 10 includes an imager 32, which is shown mounted on a printed circuit board 42 disposed adjacent a bottom of the reader housing 20. The imager 32 may be a complementary metal oxide semiconductor (CMOS) imager, a semiconductor charge-coupled device (CCD) imager, or comprise other suitable imaging technology. In one embodiment, the CMOS imager may comprise an active-pixel imaging sensor with a global shutter, such as a model EV76C570 sensor sold by e2V technologies plc of Chelmsford, England or may operate on a rolling basis.

The data reader 10 may acquire an image of the read region 28 using anyone of a variety of mirror configurations. In one embodiment, an image of the read region 28 may be divided into a first portion 28a and a second portion 28b, each of which may be reflected off a series of mirrors (or other optical components) toward focusing optics 30, which in turn focuses the portions 28a, 28b onto the imager 32. For example, the first portion 28a may be reflected sidewardly by a first mirror 34 toward a second mirror 36, which directs the first portion 28a toward the focusing optics 30. Similarly, the second portion 28b may be reflected sidewardly by a third mirror 38 toward a fourth mirror 40, which directs the second portion 28b toward the focusing optics 30. In other embodiments, the mirrors may be arranged in a different configuration suitable to provide an image of the read region 28 onto the imager 32.

Preferably, the mirrors are arranged so that at least one portion (e.g., 28c in FIG. 2) of one of the fields-of-view (e.g., view 28b in FIG. 2) is directed at an angle α that is perpendicular or substantially dose to perpendicular (for example, ranging from 70° to 90°) with reference to the window 22, and another portion (e.g., 28d in FIG. 2) of the view 28b is directed at an angle β ranging from 60° to 90° to provide optimal viewing conditions to allow the data reader 10 to acquire an image when an electronic device 16 having a highly reflective screen surface is presented.

The imager 32, alone or together with logic components such as a complex programmable logic device (CPLD) or a field-programmable gate array (FPGA), is coupled to a controller or processor 44, which, among other functions, is preferably programmed to control operating parameters of the data reader 10 as discussed in further detail below. Processor 44 is also preferably programmed to read and decode optical codes or other symbols or imaged items. The processor 44 may comprise any suitable digital processor, such as a low-power DSP core or ARM core processor. In some embodiments, processor 44 comprises an ARM9 processor AT91SAM9G20 sold by Atmel of San Jose, Calif., USA, or OMAP processor sold by Texas Instruments of Dallas, Tek, USA or an i.MX1 series processor (such as the MC9328MX1 processor) sold by Freescale Semiconductor, Inc, of Austin, Tex., USA. Alternately, multiple processors or sub-processors or other types of processor electronics such as comparators or other specific function circuits may be used alone or in combination. For the purposes of this description, the term processor is meant to include any of these combinations.

In one embodiment, the processor 44 and on-board memory 46 are mounted on PCB 42 adjacent the imager 32, and are operable for controlling operation of the imager 32 and other reader components. The memory 46 may be flash memory, random access memory, or other suitable memory in communication with the processor 44. In some embodiments, memory 46 may be integrated with processor 44.

As mentioned previously, the data reader 10 includes illumination sources 24, 26 to illuminate the optical code on the item presented to the data reader 10. In one embodiment, the illumination sources 24, 26 comprise a collection of LEDs, for example, infrared or visible spectrum LEDs, but may alternatively comprise another suitable light source, such as a lamp or laser diode. The illumination sources 24, 26 may be coupled to and controlled by the processor 44 or may be remotely mounted and powered.

Figure 4:
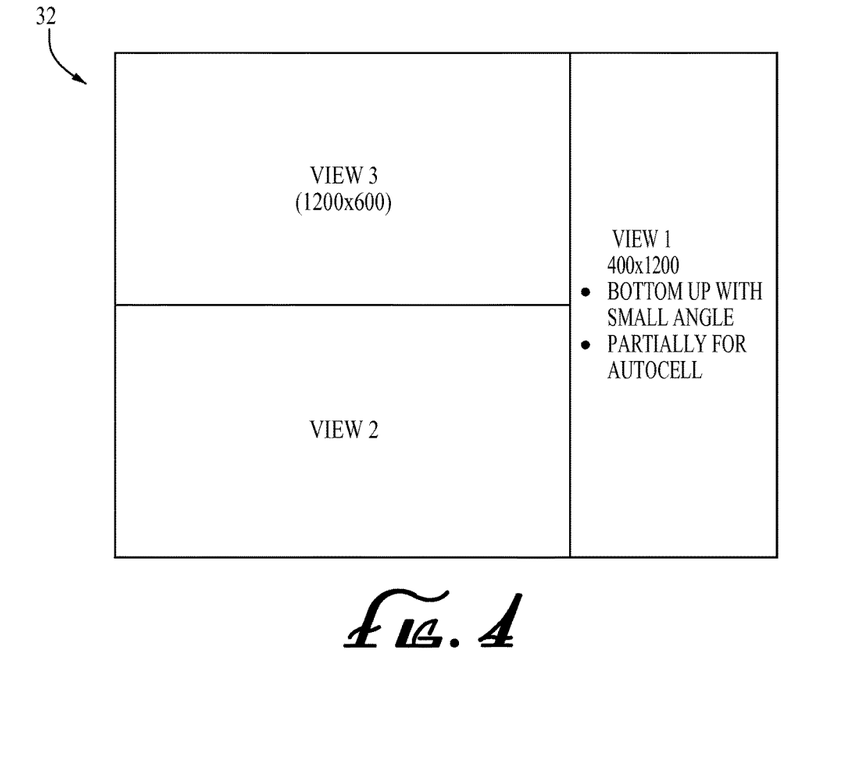
FIG. 4 is a diagrammatic view illustrating an example of imager view allocation for the data reader of FIG. 2.

With reference to FIG. 4, in one embodiment, the imager 32 may be a two megapixel imager array that is divided into three views, labeled Views 1, 2, and 3. In this configuration, Views 2 and 3 may be dedicated for normal label reading of items 50 (see FIG. 3) having little or no specular reflection issues (e.g., items with little or no surface reflectivity) for every frame. As noted previously, in a typical checkout process, most of the items (e.g., grocery items) will likely have no specular reflection issues. Accordingly, in one embodiment, a larger share of the imager array 32 (e.g., approximately ⅔ of the imager) may be dedicated specifically for capturing images of these items 50. To accommodate data reading from electronic device 16 or other surfaces having high reflectivity, View 1 may be interleaved to alternate View 1 between normal label data reading (i.e., reading of items 50 with little or no specular reflection issues) and electronic device reading mode (i.e., reading of items 16 and surfaces with high reflectivity). As is described in further detail below with particular reference to FIGS. 5-8, the processor 44 may control the activation/pulsing frequency of the illumination sources 24, 26 and imager exposure timing to allow the data reader 10 to automatically transition between the normal label reading mode and the electronic device reading mode to obtain data from a variety of items having different surface reflectivity.

Figure 5:
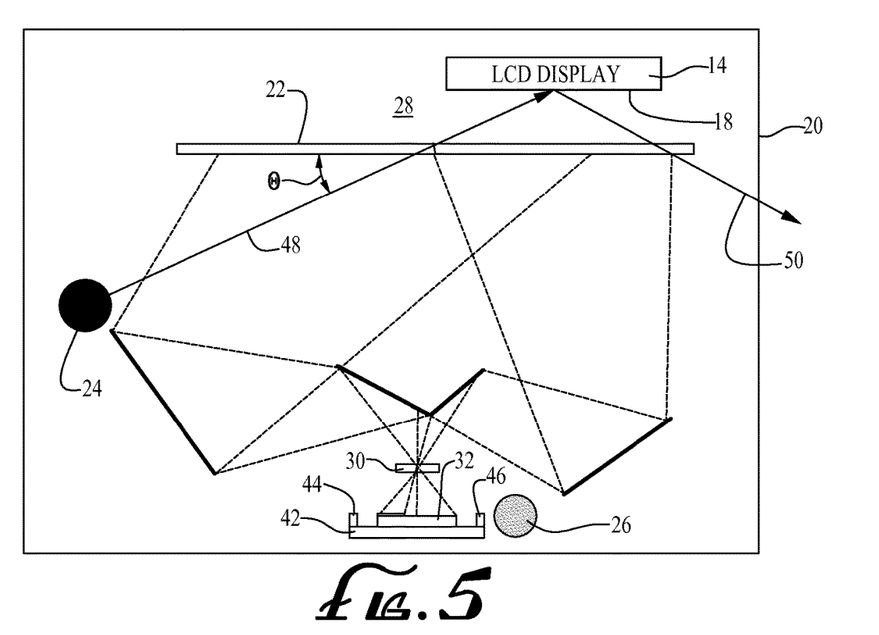
FIG. 5 is a diagrammatic view of the data reader of FIG. 2, illustrating an example reading process from a reflective surface of an electronic display.
Figure 6:
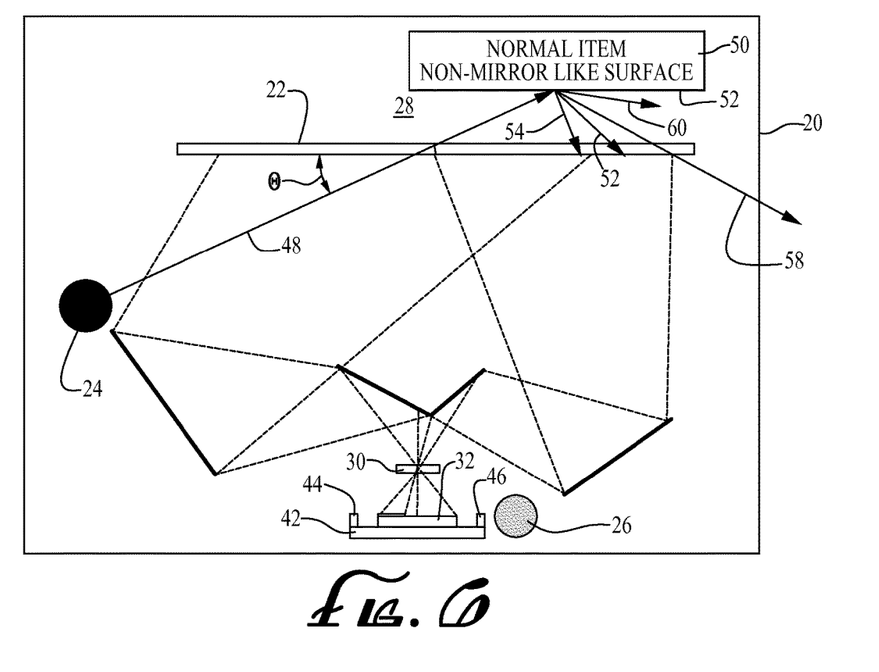
FIG. 6 is a diagrammatic view of the data reader of FIG. 2, illustrating an example reading process from a non-reflective surface or other surface with low reflectivity.

FIG. 5 is a diagrammatic view of the data reader 10 illustrating an example electronic device reading scenario for reading data from the reflective surface 18 of the self-illuminating display screen 14 of the electronic device 16. FIG. 6 is a diagrammatic view of the data reader 10 illustrating an example scenario where the data reader 10 is capable of reading optical codes from an item 50 having a non-reflective surface or surface with low reflectivity when the data reader 10 is in the electronic device reading mode. While the data reader 10 has been described previously as capable of operating in both the electronic device reading mode and a normal label reading mode, the processor 44 is capable of controlling illumination sources 24, 26 and exposure times of the imager 32 so that the data reader 10 is not only capable to capture data from electronic devices during the electronic device reading mode, but is also operable to capture data from normal items 50 that do not have highly reflective surfaces during the same electronic device reading mode. For example, when illumination source 24, 26 are activated, Views 1, 2, and 3 are optimized to read normal labels. When only one of the illumination sources (e.g., illumination source 24 in FIG. 5) is activated, Views 2 and 3 are optimized for normal label reading, and View 1 is optimized for cell phone reading as shown in FIG. 5. FIGS. 5 and 6 illustrate an embodiment of how this process operates. Additional details regarding specific control protocols by the processor 44 for controlling the illumination sources 24, 26 and exposure time of the imager 32 are further described with reference to FIGS. 7-8 below.

FIG. 5 is a diagrammatic view of the data reader 10 illustrating an example reading scenario for reading data from the reflective surface 18 of the display screen 14 of the electronic device 16. With particular reference to FIG. 5, the illumination sources 24 of the data reader 10 are preferably arranged so that when the illumination sources 24 are activated, a first travel path 48 of the illumination generated from the illumination sources 24 is generally directed at an acute angle θ relative to the window 22 so that at least a substantial portion, preferably the entirety, of the illumination generated from the illumination sources 24 is reflected off the self-illuminating display screen 14 of the electronic device 16 and travels along a second travel path 50 away from the read region 28 so that the illumination is not detected by the imager 32. Without the additional illumination from the illumination source 24 (which may otherwise saturate the imager 32), the imager 32 is able to obtain an image of the optical code 12 from the display screen 14 using the backlight illumination generated by the electronic device 16. In this embodiment, the illumination source 26 is not activated during the exposure time of the imager 32 because most of the illumination from illumination source 26 would be reflected back into the imager 32 and impair the obtained image.

It should be understood that the acute angle θ may depend on various factors, such as the number and arrangement of illumination sources 24, and a distance of the illumination sources 24 to the window 22. In addition, different light sources may have different light dispersion fields depending on various factors of the light source. For example, in one embodiment, the dispersion field may be conically shaped. Assuming the dispersion field of the illumination sources 24 is conically shaped, the acute angle θ may be measured based on a center line of the conical dispersion field.

FIG. 6 is a diagrammatic view of the data reader 10 illustrating an example of the data reader 10 obtaining an image from an item 50 having a non-reflective surface or other surface with low reflectivity when the data reader 10 is in the electronic device reading mode. In the same arrangement as described in FIG. 5, the illumination from illumination source 24 travels along the same travel path 48, but because of different specular reflection characteristics from the item 50 with a non-reflective surface 52, at least a portion of the illumination travels along a third travel path 54 and is ultimately detected by the imager 32. Depending on the reflectivity of the surface 52, portions of the illuminating traveling along travel paths 56, 58, 60 may or may not also be detected by the imager 32. The reflected light from the non-reflective surface 52 provides sufficient light for the imager 32 to obtain a decodable image of the optical label on the item 50. In some embodiments, to avoid direct reflection of illumination from the window 22 for illumination source 26, the illumination source 26 and/or the window 22 may be positioned further away from the imager 32.

The reading scenario illustrated in FIGS. 5 and 6 illustrate one embodiment for controlling the illumination sources 24, 26 and exposure time of the imager 32 during a data reading operation, which includes reading data from an LCD screen. In other embodiments, the processor 44 may control the specific activation of the illumination sources 24, 26 and the exposure time to allow the imager 32 to obtain images of the optical codes or other data present in the read region 28 without regard to the surface reflectivity of the item and without having the operator manually toggle between reading modes or periods of the data reader 10. For example, as is described in further detail in FIGS. 7 and 8, during a normal label reading mode, both the illumination sources 24, 26 may be activated during the exposure time of the imager 32 to provide sufficient illumination for the read region 28 so that the imager 32 obtains an adequately illuminated image of the optical code on the item 50.

Figure 7:
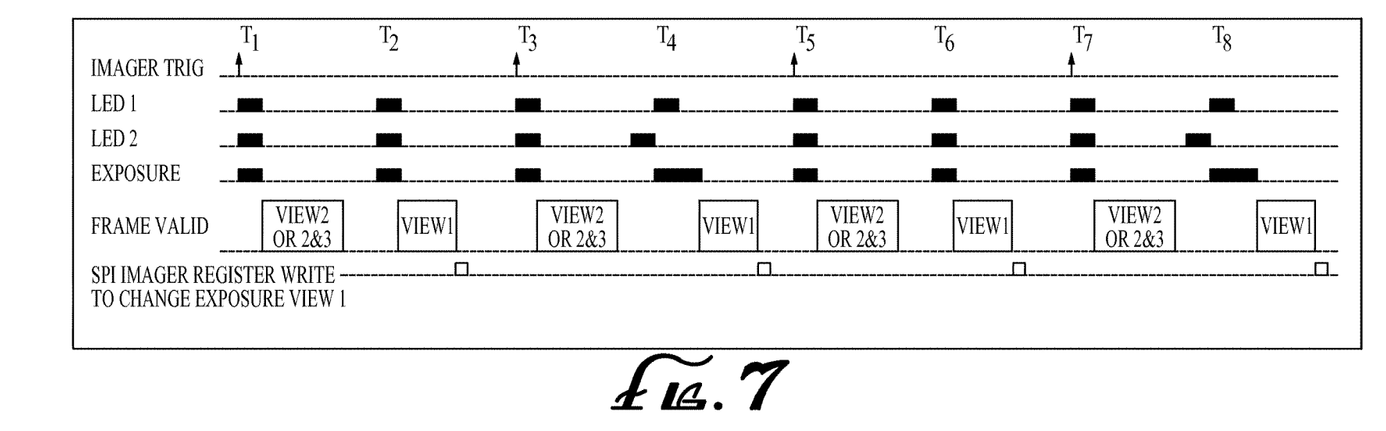
FIGS. 7-8 are diagrams illustrating relative timing of imager frame exposure and illumination pulses of the data reader of FIG. 2.
Figure 8:
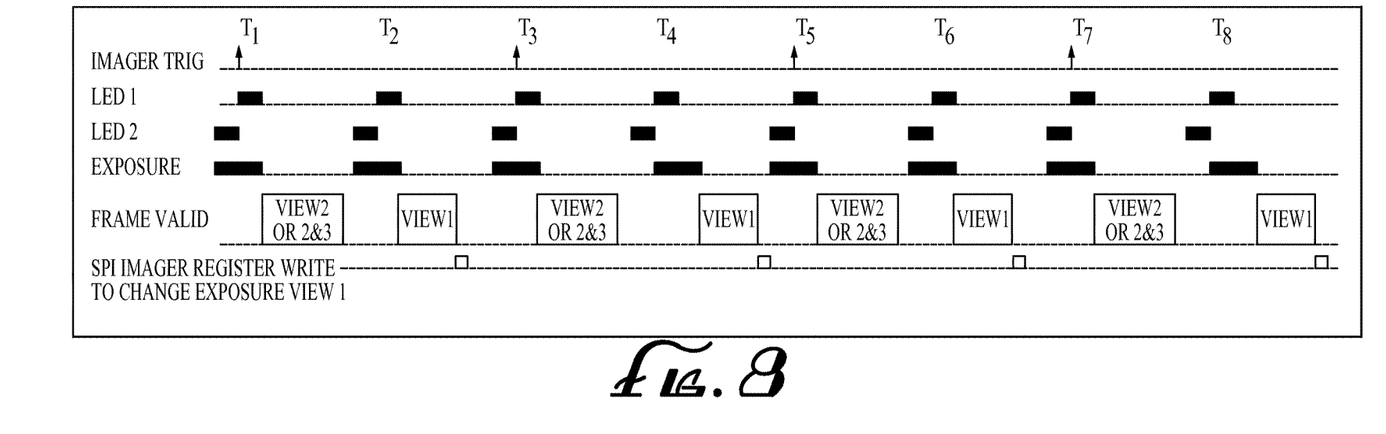

With collective reference to FIGS. 7-8, the following sections provide additional details relating to control parameters of the processor 44 for controlling illumination and exposure characteristics of the data reader 10 to allow the data reader 10 to seamlessly transition between a normal reading mode (such as reading optical codes from stickers or other surfaces with no reflectivity) and an electronic device reading mode for reading optical labels from electronic devices. As mentioned previously, the processor 44 is operable to control the illumination and exposure times of the data reader 10 to ensure that the illumination and exposure is proper to allow the data reader 10 to capture images from a highly reflective surface, such as electronic device 16, without having the imager 32 become saturated with illumination reflected from the mobile device 16, while also allowing the data reader 10 to properly illuminate optical labels or other data on surfaces with little or no reflectivity to ensure that sufficient illumination is provided to obtain a decodable image. In addition, as mentioned previously with relation to FIG. 4, certain views or sections of the imager array 32 may be specifically dedicated for a normal reading mode, and other views or sections of the imager 32 may be interleaved between the normal reading mode and an electronic device reading mode.

FIGS. 7 and 8 are diagrams illustrating relative timing of imager frame exposure and illumination control for the data reader 10 of FIG. 2 in accordance with one embodiment. With particular reference to FIG. 7, at time $T_1$, the processor 44 activates both the illumination sources 24, 26 to direct light outwardly from the window 22 and illuminate the read region 28. The processor 44 activates the illumination sources 24, 26 at a desired pulse rate and sets an exposure time for the imager 32 substantially equal to the pulse rate so that both illumination sources 24, 26 are active during the full exposure time. Turning back to FIG. 2, when illumination source 24 is activated, the illumination travels generally in a direction of the travel path 48 and at an angle θ relative to the window 22. When illumination source 26 is activated, the illumination travels generally in a direction of a travel path 62 to illuminate the read region 28. Since at least a portion of the illumination generated from the illumination source 26 travels outwardly and generally perpendicularly to the window 22, a substantial portion of the illumination from illumination source 26 may be reflected back toward the imager 32 if an item with a highly reflective surface is present at the read region 28. Accordingly, activating both illumination sources 24, 26 may be useful for items having little or no reflectivity so that the imager 32 is able to capture a proper image without being saturated from reflected illumination. However, having both illumination sources 24, 26 activated for electronic devices would likely saturate the imager 32 due to specular reflection issues as discussed previously.

Turning back to FIG. 7, at time $T_1$, when both illumination sources 24, 26 are activated during the exposure time of the imager 26, the data reader 10 is in a normal label reading mode or period, where Views 2 and 3 (see FIG. 4) of the imager 32 capture an image from items 50 having little or no reflectivity.

At time $T_2$, for View 1, the processor 44 activates both illumination sources 24, 26 and sets an exposure time equal to the pulse rate of the illumination sources 24, 26 in a similar fashion as during $T_1$. As mentioned previously, View 1 is interleaved between a normal data reading mode or period (when both illumination sources 24, 26 are activated) and an electronic device reading mode or period (when only illumination source 24 is activated). At time $T_2$, the processor 44 is operating the illumination sources 24, 26 and setting the exposure time to operate the data reader 10 in a normal reading mode or period for View 1.

At time $T_3$, the processor 44 again activates both illumination sources 24, 26 and sets an exposure time equal to the pulse rate of the illumination sources 24, 26 in a similar fashion as during $T_1$. During time $T_3$, the data reader 10 continues operating in a normal label reading mode or period.

At time $T_4$, the data reader 10 switches to an electronic device reading mode or period. During time $T_4$, the processor 44 controls illumination sources 24, 26 so that illumination source 24 is activated during the exposure time while illumination source 26 is not activated. In this configuration, View 1 captures an image from the electronic device 16 when it is present in the read region 28. Because the illumination source 26 is not active during the exposure time, the illumination from illumination source 26 does not saturate the image obtained by the imager 32 in View 1. As was described previously with respect to FIGS. 5 and 6, when the data reader 10 operates in an electronic device reading mode or period, the illumination from illumination source 24 is mostly (if not entirely) reflected away from the imager 32 due to the angle $\theta$ at which the illumination source 24 is directed toward the reflective surface 18 of the electronic device 16. Accordingly, the imager 32 is able to capture a properly illuminated image (using ambient light and illumination from the backlit display screen of the electronic device 16) while avoiding light saturation issues since little or no illumination is reflected back into the imager 32 from illumination source 24 and illumination source 26 is inactive during time $T_4$. Moreover, as described with reference to FIG. 6, when a normal item 50 is presented to the data reader 10 during time $T_4$, a sufficient amount of illumination from illumination source 24 is reflected back toward the imager 32 to allow the data reader 10 to capture an image of the normal item 50 when the data reader 10 is optimized for reading data from an electronic device. Accordingly, the control of the illumination source 24, 26 allows the data reader 10 to operate to read normal items 50 even when specifically configured to read an optical label 12 from an electronic device 16.

In some embodiments, as illustrated in FIG. 7, the exposure time during time $T_4$ may be lengthened (as compared to the exposure time during the normal item reading mode) to provide sufficient time for the imager 32 to properly capture an image of the optical code 12 from the electronic device 16. In some embodiments, the illumination source 24 may be activated by the processor 44 for only a portion of the exposure time, where the ambient illumination from the electronic device 16 may also serve to sufficiently illuminate the read region 28 without the need for additional illumination from the data reader 10.

The same process described during times $T_1$ through $T_4$ may be repeated again at times $T_5$ through $T_8$ (and so on) in a similar fashion to interleave the data reader 10 between a normal item reading mode and an electronic device reading mode.

It should be understood that the scenario described with reference to FIG. 7 is only one embodiment. In other embodiments, the processor 44 may be programmed to operate at any desired interleaving ratio for View 1. For example, as described, the processor 44 interleaves View 1 between normal item reading mode and an electronic device reading mode in a 1:1 ratio, that is, View 1 alternates between the normal item reading mode and the electronic device reading mode. For typical checkout processes, this interleaving ratio may be suitable since most, if not all, of the items 50 likely will have no specular reflection issues. However, in other embodiments where the data reader 10 may regularly or primarily read data from electronic devices 16, the interleaving ratio may be greater such that View 1 is dedicated for electronic device reading more often. Conversely, where the data reader 10 does not often read from electronic devices, then the interleaving ratio may be smaller such that View 1 operates in an electronic device reading mode once every three or four cycles, for example.

In other embodiments, the processor 44 may operate and control the illumination sources 24, 26 and the exposure times in a different manner to effectively alternate between the normal reading and electronic device reading modes. In one embodiment, the processor 44 may operate in a multiple integration mode with a long exposure time and cycling the illumination sources 24, 26 independently from one another during the exposure time.

For example, with reference to FIG. 8, at time $T_1$, the processor 44 may activate illumination source 26 during a first portion of the exposure time (while illumination source 24 is deactivated), and thereafter activate illumination source 24 (while illumination source 26 is deactivated) during a second portion of the exposure time. In this arrangement, the captured frame of the read region 28 corresponds to Views 2 and 3 of the imager 32. The same cycling of illumination sources 24, 26 may be run at time $T_2$ and $T_3$, with the captured frame at time $T_2$ corresponding to View 1 of the imager 32 and the captured frame at time $T_3$ corresponding to Views 2 and 3 of the imager 32. At all three times $T_1$, $T_2$, and $T_3$, the data reader 10 is operating in a normal item reading mode to read optical labels or other data from items 50 with little or no surface reflectivity.

At time $T_4$, the processor 44 alternates to the electronic device reading mode. In this arrangement, the processor 44 activates illumination source 24 during a first portion of the exposure time, and thereafter deactivates illumination source 24 during a second portion of the exposure time. During time $T_4$, the Illumination source 26 is not activated at any point during the exposure time of the imager 32 to minimize or avoid reflected illumination into the imager 32 from illumination source 26. As described previously and illustrated in FIG. 5, the illumination from illumination source 24 is substantially (if not entirely) reflected away from the imager 32 when an electronic device 16 is present in the read region 28. The same process described during times $T_1$ through $T_4$ may be repeated again at times $T_5$ through $T_9$ in a similar fashion to cycle the data reader 10 between a normal item reading mode and an electronic device reading mode.

It should be understood that the scenario described with reference to FIG. 8 is only one embodiment. In other embodiments, the processor 44 may be programmed to operate at any desired interleaving ratio for View 1. For example, as described, the processor 44 interleaves View 1 between normal item reading mode and an electronic device reading mode in a 1:1 ratio, that is, View 1 alternates between the normal item reading mode and the electronic device reading mode. For typical checkout processes, this interleaving ratio may be suitable where many of the items 50 may not have specular reflection issues. However, in other embodiments where the data reader 10 may regularly or primarily read data from electronic devices, such as electronic device 16, the ratio may be greater such that View 1 is more often dedicated for electronic device reading. Conversely, where the data reader 10 does not often read from electronic devices, then the interleaving ratio may be smaller such that View 1 operates in an electronic device reading mode once every three or four cycles, for example.

In other embodiments, the processor may be programmed to pulse one or more of the illumination sources to avoid or minimize the perception of illumination flicker by a user or bystander while implementing methods for reading optical codes presented on electronic display screens or other highly reflective surfaces. Additional details relating to example embodiments are described in U.S. Pat. No. 9,122,939, the disclosure of which is incorporated by reference herein in its entirety.

While certain preferred systems and methods have been shown and described, it will be apparent to one skilled in the art that modifications, alternatives and variations are possible without departing from the inventive concepts set forth herein. Therefore, the invention is intended to embrace all such modifications, alternatives and variations.

The invention claimed is:

1. A system for data reading comprising:
   a window;
   an imager for capturing an image of an item bearing an optical code, the imager including an imager array divided into a first portion and a non-overlapping second portion;
   an illumination system for illuminating the item, the illumination system including a first illumination source and a second illumination source, each of which direct light outwardly through the window and into a read region; and
   a controller in operative communication with the imager and the illumination system, wherein the controller is programmed to operate the imager and the illumination system during a first reading frame at a first time period and during a second reading frame at a subsequent second time period,
      wherein during the first time period for the first reading frame, the controller is programmed to activate both the first and second illumination sources during a first exposure period of the imager, the controller operating the imager to capture a first image of a first optical code when a first item is present in the read region, wherein the first portion of the imager is exposed during the first exposure period to capture the first image on the first portion of the imager; and
      wherein during the second time period for the second reading frame, the controller is programmed to activate the first illumination source during a second exposure period of the imager, and deactivate the second illumination source during the second exposure period, the controller operating the imager to capture a second image of a second optical code when a second item is present in the read region, wherein the second portion of the imager is exposed during the second exposure period to capture the second image on the second portion of the imager.

2. The system of claim 1, where the first illumination source is oriented such that illumination generated from the first illumination source is directed toward the window at an acute angle relative to the window, and wherein when the second item is a reflective display of an electronic device, the illumination generated from the illumination source is reflected off the reflective display such that the imager does not detect the illumination from the first illumination source.

3. The system of claim 2, wherein when the item does not have a reflective display, the first illumination source is reflected back toward the imager.

4. The system of claim 1, wherein the processor is further programmed to interleave between the first reading period and the second reading period to capture images of items on the first portion of the imager.

5. The system of claim 4, wherein the processor is further configured to operate the data reader in the first reading period to capture images of items on the second portion of the imager.

6. The system of claim 4, wherein the processor is configured to interleave between the first and second reading periods at an interleaving ratio of 1:1.

7. The system of claim 1, wherein during the first reading period, the processor is programmed to pulse the first and second illumination sources substantially simultaneously at a pulse rate at least equal to the first exposure period of the imager.

8. The system of claim 1, wherein during the second reading period, the processor is programmed to pulse the first illumination source at a pulse rate at least equal to the first exposure period of the imager.

9. The system of claim 1, wherein during the first reading period, the processor is programmed to activate the first illumination source and then the second illumination source in sequence during the first exposure period of the imager.

10. A method for data reading using a data reader having a window, an imager for capturing an image of an item, the imager including an imager array divided into a first portion and a non-overlapping second portion, and an illumination system including a first illumination source and a second illumination source, the method comprising the steps of:
    in a first reading frame at a first time period,
       activating, via a processor, the first and second illumination sources during a first exposure period of the imager to direct light outwardly from the window and into a read region;
       exposing, via the processor, the first portion of the imager during the first exposure period;
       if a first item is present in the read region, capturing, via the imager, a first image of the first item on the first portion of the imager during the first exposure period; and
    in a second reading frame at a second time period subsequent to the first time period,
       activating, via a processor, the first illumination sources during the second exposure period to direct light outwardly from the window and into a read region;
       deactivating, via the processor, the second illumination sources during the second exposure period;
       exposing, via the processor, the second portion during the second exposure period; and
       if a second item is present in the read region, capturing, via the imager, a second image of the second item on the second portion of the imager during the second exposure period.

11. The method of claim 10, further comprising interleaving, via the processor, between the first reading period and the second reading period to capture images of items on the first portion of the imager.

12. The method of claim 11, further comprising operating, via the processor, the data reader in the first reading period to capture images of items on the second portion of the imager.

13. The method of claim 12, further comprising interleaving, via the processor, between the first and second reading period at an interleaving ratio of 1:1.

14. The method of claim 10, further comprising pulsing, via the processor, the first and second illumination sources substantially simultaneously at a pulse rate at least equal to the first exposure period of the imager during the first reading period.

15. The method of claim 10, further comprising pulsing, via the processor, the first illumination source at a pulse rate at least equal to the first exposure period of the imager during the second reading period.

16. The method of claim 10, further comprising activating, via the processor, the first illumination source and then the second illumination source in sequence during the first exposure period of the imager during the first reading period.

17. A system for data reading comprising:
a window;
an imager for capturing an image of an item bearing an optical code;
an illumination system for illuminating the item, the illumination system including a first illumination source and a second illumination source, each of which direct light outwardly through the window and into a read region, where the first illumination source is oriented such that illumination generated from the first illumination source is directed toward the window at an acute angle relative to the window, and wherein when the second item is a reflective display of an electronic device, the illumination generated from the illumination source is reflected off the reflective display such that the imager does not detect the illumination from the first illumination source; and
a controller in operative communication with the imager and the illumination system, wherein the controller is programmed to operate the imager and the illumination system during a first reading period and a different second reading period,
wherein during the first reading period, the controller is programmed to activate both the first and second illumination sources during a first exposure period of the imager, the controller operating the imager to capture a first image of a first optical code when a first item is present in the read region; and
wherein during the second reading period, the controller is programmed to activate the first illumination source during a second exposure period of the imager, and deactivate the second illumination source during the second exposure period, the controller operating the imager to capture a second image of a second optical code when a second item is present in the read region.

18. The system of claim 17, wherein the imager is an imager array divided into a first portion and a non-overlapping second portion, and wherein the processor is further programmed to interleave between the first reading period and the second reading period to capture images of items on the first portion of the imager.

19. The system of claim 18, wherein the processor is further configured to operate the data reader in the first reading period to capture images of items on the second portion of the imager.

20. The system of claim 18, wherein the processor is configured to interleave between the first and second reading periods at an interleaving ratio of 1:1.

* * * * *

UNITED STATES PATENT AND TRADEMARK OFFICE
CERTIFICATE OF CORRECTION

PATENT NO. : 9,594,936 B1  
APPLICATION NO. : 14/932850  
DATED : March 14, 2017  
INVENTOR(S) : WenLiang Gao Page 1 of 1

It is certified that error appears in the above-identified patent and that said Letters Patent is hereby corrected as shown below:

In the Specification

In Column 5, Line 38, please change "substantially dose to" to --substantially close to--.

In Column 5, Line 59, please change "Dallas, Tek." to --Dallas, Tex.--.

In Column 5, Line 60, please change "Inc, of Austin, Tex." to --Inc. of Austin, Tex.--.

In Column 10, Line 54, please change "through $T_9$" to --through $T_8$--.

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*